United States Patent [19]

Tardy et al.

[11] Patent Number: 4,861,979
[45] Date of Patent: Aug. 29, 1989

[54] OPTICAL FIBER MULTIPOINT MEASURING DEVICE WITH TIME MULTIPLEXING

[75] Inventors: André Tardy, Egly; Michel Jurczyszyn, Ivry sur Seine, both of France

[73] Assignee: Societe anonyme dite Compagnie Generale D'Electricite, Paris Cedex, France

[21] Appl. No.: 55,972

[22] Filed: Jun. 1, 1987

[30] Foreign Application Priority Data

May 30, 1986 [FR] France ............................ 86 07818

[51] Int. Cl.$^4$ .............................................. H01J 5/16
[52] U.S. Cl. .................................. 250/227; 250/231 R
[58] Field of Search ............... 250/227, 231 R, 231 P; 73/705, 800

[56] References Cited

U.S. PATENT DOCUMENTS

| | | | |
|---|---|---|---|
| 4,409,479 | 10/1983 | Lofgren et al. | 250/231 R |
| 4,417,140 | 11/1983 | Adolfsson et al. | 250/227 |
| 4,713,538 | 12/1987 | Theocharous | 250/227 |

FOREIGN PATENT DOCUMENTS

| | | |
|---|---|---|
| 1185469 | 4/1985 | Canada . |
| 2639120 | 3/1978 | Fed. Rep. of Germany . |
| 2439393 | 5/1980 | France . |
| 8404439 | 11/1984 | United Kingdom . |

*Primary Examiner*—David C. Nelms
*Assistant Examiner*—Eric F. Chatmon
*Attorney, Agent, or Firm*—Sughrue, Mion, Zinn, Macpeak & Seas

[57] ABSTRACT

Twenty temperature sensors follow one another along a measurement fiber. Each successively reflects a small fraction of the energy of an interrogation light pulse running along said fiber, with the value of the fraction being indicative of temperature. To do this, each sensor is constituted by a gap between two successive lengths (F2, F3) of an optical fiber, said gap being filled with a transparent glue (36) whose refractive index varies as a fuction of temperature. The interrogation pulse is returned solely by the optical surface constituted by the end face (38) of the upstream length (F2) of the fiber.

11 Claims, 3 Drawing Sheets

OPTICAL FIBER MULTIPOINT MEASURING DEVICE WITH TIME MULTIPLEXING

The present invention relates to measuring a physical magnitude, such as temperature or pressure at successive points along a measurement line.

A first device for making such measurements is described by a communication to the First International Conference on Optical Fiber Sensors held at London from 26 to 28 April 1983, given by E. Theocharous, and entitled "Differential Absorption Distributed Thermometer" (IEE, conference publication number 221, pp. 10 to 12).

This communication describes sending a short interrogation light pulse into an optical fiber. Successive lengths of this fiber are separated by thin plates of a ruby glass which absorbs a spectral component of said pulse to a greater or lesser extent depending on its temperature, thereby constituting sensors. The intensity of the component transmitted to the length of optical fiber downstream from such a plate therefore depends on the temperature of said plate. The same applies to the light of said component which is back-scattered by said downstream length, and the temperature can be obtained by measuring the intensity of said light. In addition, by measuring the time that elapses between sending the interrogation pulse and receiving the back-scattered light, it is possible by taking account of the known propagation speed of light in the fiber to determine the portion of fiber from which said back-scattered light comes, thereby making it possible to attribute different temperature measurements to different sensors.

This first prior art device suffers from the drawback that it is incapable of maintaining good measurement accuracy and sensitivity when the number of sensors, i.e. the number of measurement points, exceeds ten.

That is why the present inventors have proposed a second device comprising:

a transmission/reception body (2);

a generator (4,6) in said body for generating interrogation light pulses;

an optical fiber (F) disposed along said line and transmitting light at a known propagation speed, one end of said fiber being connected to said body to receive said interrogation light pulses, said fiber guiding said pulses while returning along its entire length a back-scattered light signal towards said body;

sensors (C1, C2, C3, ... C20) disposed at respective ones of said successive measurement points, each of said sensors including a transparent gap between an upstream length (F2) and a downstream length (F3) of said fiber and also including means for maintaining said two lengths in alignment to transmit each of said interrogation pulses from the upstream length to the downstream length and towards the following sensors, such that a back-scattered signal is returned from each of the successive lengths of said fiber, said fiber and said sensors constituting said measurement line, a light reflecting optical surface being formed by an end face (38) of one of said upstream and downstream lengths (F2, F3), said face being perpendicular to the length of said fiber (F) in order to respond to said interrogation pulse by returning a reflection pulse (P2) towards said body, said gap being occupied by a sensitive medium (36) having a refractive index sensitive to said physical magnitude to be measured such that the coefficeint of reflection from said optical surface and the intensity of said reflected pulse depend on the value of said magnitude; and a reception circuit (16, 18, 20) comprising a light detector (16) disposed in said body (2) to receive said light returned towards said body in order to measure the intensity thereof as a function of time to generate measurement signals from the intensity of said reflection pulses and representative of the values of said physical magnitude, and to make said measurement signals correspond with respective ones of said sensors as a function of the times at which said reflection pulses are received by said detector;

This device is mentioned in the "Communications Summary" published by SPIE, P.O. Box 10, Bellingham, Washington 98227-0010 USA on "Industrial Applications of Optical Fiber Sensors", in a communication by André Tardy.

The present invention seeks to provide a device analogous to said second device in a manner which is simple and reliable whilst nevertheless providing said device with good sensitivity and good accuracy.

The device according to the invention is characterized by the fact that said sensitive medium is an optical glue (36) which is hardenable from a prior liquid state and which adheres to said upstream and downstream lengths (F2, F3).

The following dispositions are preferably adopted:

An end segment of each of said upstream and downstream lengths (F2, F3) extends inside an alignment tube (34) which constitutes said alignment maintaining means and which is filled with said optical glue (36), said tube having a diameter which is slightly greater than the diameter of said optical fiber (F), said two lengths being disposed in said tube in contact with a common generator line thereof and leaving said gap therebetween in such a manner as to enable said sensors to be easily implemented.

Said optical glue (36) is of a type that hardens under the action of radiation, such as ultraviolet radiation, and also by the fact that said alignment tube (34) is made of a glass such as silica glass which is transparent to said radiation.

When said magnitude to be measured is temperature, said alignment tube (34) has a thin wall to allow heat to pass easily, and is disposed in a thick-walled connector (42) made of a thermally conductive metal, and is connected thereto by a non-thermally insulating medium (44) so as to transmit the external temperature to said sensitive medium (36) in said gap between the upstream and downstream lengths (F2, F3) while providing mechanical strength to the sensor.

Said metal connector (42) has two end fittings (46) for receiving and fixing the outer mechanical sheaths which are poor conductors of heat (32) of the upstream and downstream lengths of an optical cable (14) containing said upstream and downstream lengths (F2, F3) of the optical fiber (F), respectively, thereby ensuring continuity of the mechanical strength of said measurement line.

Further, said reception circuit (16, 18, 20) includes a processor circuit (20) which generates said single measurement signal corresponding to one of said sensors (C2) by determining the ratio between the intensity of said reflection pulse (VP2) and the intensity of a reference signal (VM2) constituted by said back-scattered signal received slightly before said pulse, i.e. from said length (F2) upstream from said sensor, such that said measurement signal is not modified by any disturbance which may affect the measurement line at a distance from said sensor.

The relative difference between the refractive indices of the two mediums (F2, 36) on either side of said return optical surface (38) lies between about 0.3 thousandths and 10 thousandths so that said coefficient of reflection lies between about 0.3 ten thosandths and about one thousandth and so that the peak intensity due to said reflection pulse (P2) is close to twice the peak intensity of the reference signal (VM2), said pulse being superposed on the back-scattered signal (VP2) occurring at the same time and thus giving rise to a resulting intensity which is three times the intensity of the reference signal, said intensities being measured in said reception circuit (16, 18, 20), (VM2), so as to provide the device with good sensitivity.

Said optical fiber (F) is a gradient index multimode fiber and said interrogation pulse generator comprises a semiconductor laser emitter (6) emitting at a wavelength of about 0.85 micrometers.

Said pulse generator (4,6) emits repetitive interrogation pulses having a pulse width of less than 100 nanoseconds and preferably of about 10 nanoseconds, and said light detector is constituted by a semiconductor avalanche photodiode (16).

The values of the reflection coefficients of said reflecting optical surfaces are chosen to be small so that the energy of said interrogation pulse and the energy of each of said reflection pulses are reduced little as they pass through each of said sensors, and so that the number of said sensors can therefore be chosen to be large without affecting the measurement accuracy and sensitivity.

Said interrogation pulse is short so that the reflection pulses are also short, and the shortness of the duration over which the energy of each reflection pulse is spread enables said reception circuit to measure accurately in spite of the presence of said back-scattered signals and in spite of the fact that said energy has a low value due to the low value of said reflection coefficient.

The number of said sensors (C1, C2, C3, ... C20) is not less than four, is preferably not less than ten, and, for example, is about twenty.

The reference symbols used above in parentheses refer in purely illustrative manner to the accompanying diagrammatic figures, and reference is made below to the same figures for describing more particularly, but likewise solely by way of non-limiting example, how the present invention may be implemented. When the same item appears in several figures, it is designated therein by the same reference symbol.

The device described by way of example includes all of the above-described dispositions.

Figure 1:
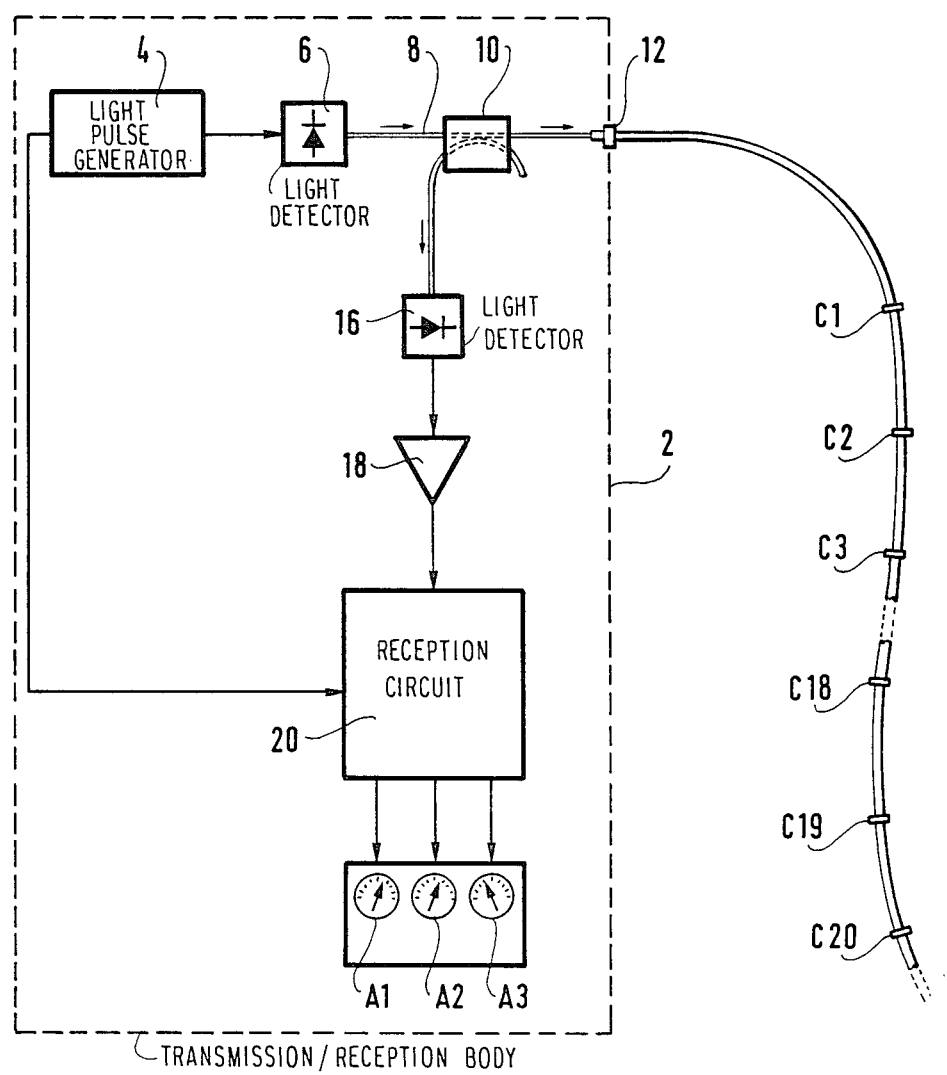
FIG. 1 is an overall view of a device in accordance with the present invention.

As shown in FIG. 1, the device comprises a transmission/reception body 2 which includes an electric pulse generator 4 supplying 10 ns duration pulses which follow one another at a frequency of 1 KHz. This generator feeds a semiconductor laser diode 6 which injects the above-mentioned interrogation light pulses into a length of fiber 8 inside the body 2. The wavelength is 0.83 micrometers.

Figure 2:
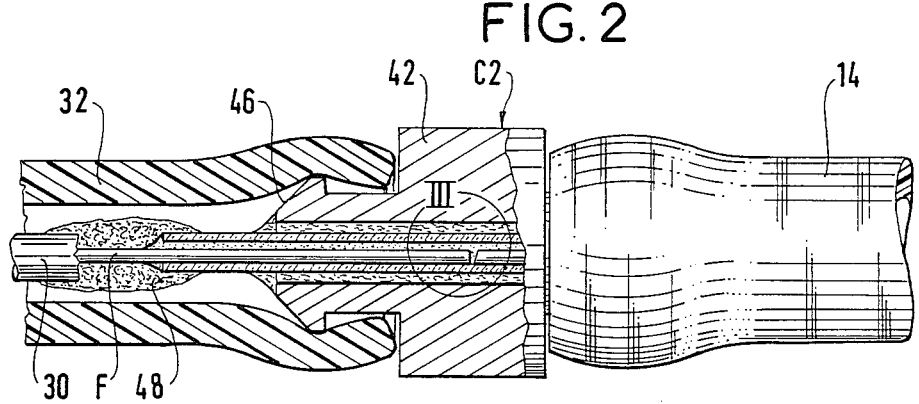
FIG. 2 is a view of a sensor in said device shown in section on a plane passing through the axis of the sensor.

This internal length 8 passes through a one-way receive coupler 10 whose function is described below and then reaches a connector 12 situated on the wall of a housing containing the body 2. The connector injects interrogation pulses into a measurement line constituted by an optical cable 14 containing an optical fiber F (see FIG. 2) which is split into successive lengths such as F2 and F3 (see FIG. 3) by twenty successive sensors C1, C2, C3, ..., C18, C19, and C20. Each of these lengths may be five meters (m) long, for example.

Figure 5:
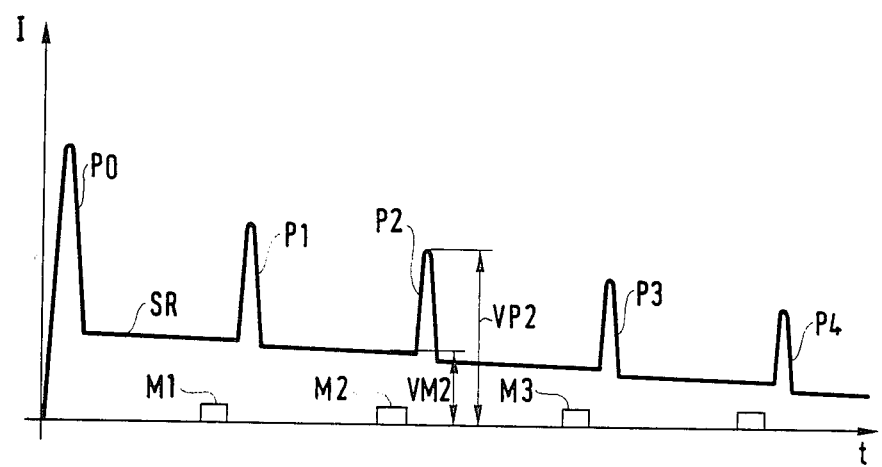
FIG. 5 is a graph showing the variation of the light power returned to the receiver circuit from such a sensor as a function of time plotted along the X-axis.

The back-scattered light returned by said fiber and the reflected light pulses returned by said sensors along said fiber are received in the body 2 via the connector 12. They reach the one-way coupler 10 which then transmits them to an avalanche semiconductor photodiode 16. The photodiode responds by providing an electric reception signal representative of the light power it receives at any moment. This signal is amplified by an amplifier 18 and is received in a processing circuit 20. This power (or signal) is shown in FIG. 5. It comprises, after each interrogation pulse has been emitted, an initial interference pulse PO resulting from fact that the coupler 10 is not a perfect one-way device, and a succession of reflection pulses such as P1, P2, P3, etc. ... up to P20 each of which is received from a corresponding one of the sensors C1, C2, C3, etc. ... up to C20. In between these pulses, the received signal is a back-scattered signal SR resulting from light of the interrogation pulse being back-scattered by the fiber. The intensity of these pulses and of this signal falls off slowly up to pulse P20. This drop in intensity is due above all to the fact that part of the energy of the interrogation pulse is lost in each successive sensor by virtue of alignment defects between the successive lengths, and to a small extent to attenuation in the fiber F. The energy loss due to reflection is relatively negligible.

The circuit 20 is triggered by each interrogation pulse emitted by the generator 4 and it is suitable for recognizing the pulses such as P0, P1, etc.

At a predetermined length of time after each of the pulses P0, P1, P2, etc. it generates a measuring pulse or window such as M1, M2, or M3. This period of time is selected, taking account of the speed of propagation of light along the fiber F, so that the measuring window occurs slightly (e.g. twenty nanoseconds) before the corresponding reflection pulse such as P0, P1, P2, or P3. In each of these measurement windows, e.g. M2, the circuit 20 records the value, e.g. VM2, of the backscattered signal SR. It also measures the value, e.g. VP2 of the reflection pulse, e.g. P2 which follows said window.

It calculates the ratio between these two values to provide a measurement signal, e.g. SM2 (not shown) such that SM2=VP2/VM2.

The sensors are chosen in such a manner that when maximum sensitivity is required, this ratio is equal to about 3, it being understood that the ratio varies depending on the temperature of the sensors. After each interrogation pulse, the processor circuit 20 records each of the values such as SM1, SM2, SM3, etc. ... of the measurement signal corresponding to respective sensors such as C1, C2, C3, etc.

After sending a plurality of interrogation pulses, it calculates the average of the measurement signals such as SM2 corresponding to each sensor such as C2 and displays said average on a display device such as A2 corresponding to said sensor, it being understood that each sensor C1, C2, C3, etc. ... corresponds to a display device such as A1, A2, A3, etc.

The photodiode 16, the amplifier 18, and the circuit 20 constitute the above-mentioned reception circuit.

The gradient index optical fiber F (FIG. 2) comprises an optical core and optical cladding which are not shown separately in the figures. It is surrounded by a fiber sheath 20 made of plastic and the optical cable 14 is constituted by disposing the sheathed optical fiber in a cable sheath 32 having good mechanical strength.

Figure 3:
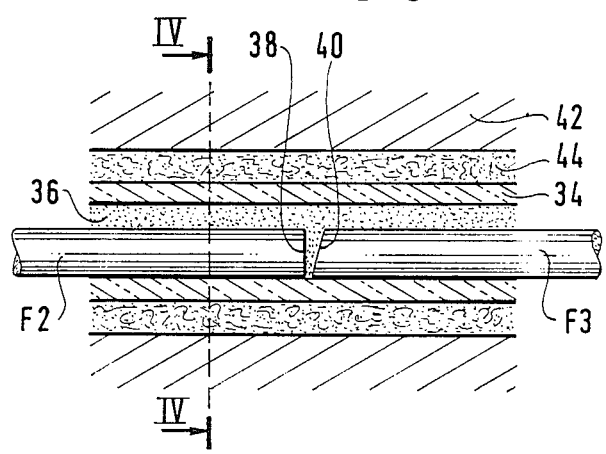
FIG. 3 shows a detail III of FIG. 2 on a larger scale.
Figure 4:
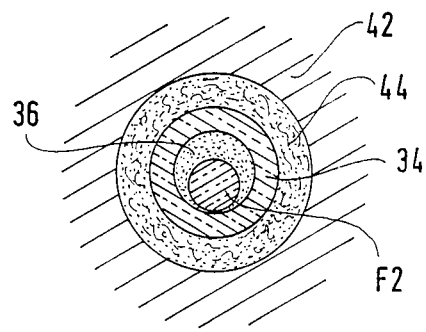
FIG. 4 shows the same sensor and on the same larger scale, but as a section on a plane IV—IV of FIG. 3, said plane being perpendicular to the axis of the sensor.

In order to constitute a sensor such as C2, the fiber is cut into two lengths, such as an upstream length F2 and a downstream length F3 (FIG. 3). These two lengths are disposed in an alignment tube 34 lying against the same generator line of said tube which is constituted by silica glass which is transparent to ultra violet, and having an inside diameter of 0.25 mm, an outside diameter of 0.40 mm and a length of 2.5 mm.

The tube is filled with an optical glue 36 such as acrylic polyurethane or acrylic epoxy.

This glue adheres to the tube and to the fiber lengths therein and has a refractive index with reduces by about one-ten-thousandth when its temperature rises by one degree Celsius, with an index of 1.495 at an average temperature (50° C. ) given a fiber core having an index of 1.49. The glue is applied in the liquid state and is polymerized by ultraviolet radiation passing through the wall of the tube 34.

The end 38 of the upstream length F2 is cut by cleaving in such a manner as to be as close possible to a plane perpendicular to the fiber and to constitute said light reflecting optical surface. The end 40 of the downstream length is cut more approximately along a plane which is inclined at 20°, for example, relative to the plane perpendicular to the axis of the fiber. The glue 36 contained in the gap between these two end faces constitutes the above-mentioned sensitive medium.

The tube 34 is disposed with slight play in a bore formed in the axis of a connector 42 made of solid copper and it is glued therein by a thermally conductive epoxy glue. The outside diameter of the connector is a little greater than the running diameter of the cable 14. The connector has two longitudinally opposite latching end fittings such as 46 for receiving the ends of two lengths of the sheath 32 of the cable 14 thereby providing continuity for the mechanical strength of said cable, in particular in traction.

The two ends of the alignment tube 34 are connected to the two ends of the fiber sheath 30 made of plastic by two drops of resin such as 48.

A device made in this way is usable, in particular, for monitoring a mass of coal in a mine.

We claim:

1. An optical fiber multipoint measuring device with time multiplexing and intended to measure the values of a physical magnitude which arise at measurement points that succeed one another along a measurement line, said device comprising:
    a transmission/reception body (2);
    a generator (4,6) in said body for generating interrogation light pulses;
    an optical fiber (F) disposed along said line and transmitting light at a known propagation speed, one end of said fiber being connected to said body to receive said interrogation light pulses, said fiber guiding said pulses while returning along its entire length a back-scattered light signal towards said body;
    sensors (C1, C2, C3, . . . C20) disposed at respective ones of said successive measurement points, each of said sensors including a transparent gap between an upstream length (F2) and a downstream length (F3) of said fiber and also including means for maintaining said two lengths in alignment to transmit each of said interrogation pulses from the upstream length of the downstream length and towards the following sensors, such that a back-scattered signal is returned from each of the successive lengths of said fiber, said fiber and said sensors constituting said measurement line, a light reflective optical surface being formed by an end face (38) of one of said upstream and downstream lengths (F2, F3), said face being perpendicular to the length of said fiber (F) in order to respond to said interrogation pulse by returning a reflection pulse (P2) towards said body, said gap being occupied by a sensitive medium (36) having a refractive index sensitive to said physical magnitude to be measured such that the coefficient of reflection from said optical surface and the intensity of said reflected pulse depend on the value of said magnitude; and
    a reception circuit (16, 18, 20) comprising a light detector (16) disposed in said body (2) to receive said light returned towards said body in order to measure the intensity thereof as a function of time to generate measurement signals from the intensity of said reflection pulses and representative of the values of said physical magnitude, and to make said measurement signals correspond with respective ones of said sensors as a function of the times at which said reflection pulses are received by said detector;
    said device being characterized by the fact that said sensitive medium is an optical glue (36) which is hardenable from a prior liquid state and which adheres to said upstream and downstream lengths (F2, F3).

2. A device according to claim 1, said device being characterized by the fact that an end segment of each of said upstream and downstream lengths (F2, F3) extends inside an alignment tube (34) which constitutes said alignment maintaining means and which is filled with said optical glue (36), said tube having a diameter which is slightly greater than the diameter of said optical fiber (F), said two lengths being disposed in said tube in contact with a common generator line thereof and leaving said gap therebetween in such a manner as to enable said sensors to be easily implemented.

3. A device according to claim 2, characterized by the fact that said optical glue (36) is of a type that hardens under the action of radiation, such as ultraviolet radiation, and also by the fact that said alignment tube (34) is made of a glass such as silica glass which is transparent to said radiation.

4. A device according to claim 3, characterized by the fact that said optical glue is an acrylic polyurethane resin.

5. A device according to claim 3, characterized by the fact that said optical glue is an acrylic epoxy resin.

6. A device according to claim 2, wherein said magnitude to be measured is temperature, and characterized by the fact that said alignment tube (34) has a thin wall to allow heat to pass easily, and is disposed in a thick-walled connector (42) made of a thermally conductive metal, and is connected thereto by a non-thermally insulating medium (44) so as to transmit the external temperature to said sensitive medium (36) in said gap between the upstream and downstream lengths (F2, F3) while providing mechanical strength to the sensor.

7. A device according to claim 6, characterized by the fact that said metal connector (42) has two end fittings (46) for receiving and fixing the outer mechanical sheaths which are poor conductors of heat (32) of the upstream and downstream lengths of an optical cable (14) containing said upstream and downstream lengths (F2, F3) of the optical fiber (F), respectively, thereby ensuring continuity of the mechanical strength of said measurement line.

8. A device according to claim 1, characterized by the fact that said reception circuit (16, 18, 20) includes a processor circuit (20) which generates said single measurement signal corresponding to one of said sensors (C2) by determining the ratio between the intensity of said reflection pulse (VP2) and the intensity of a reference signal (VM2) constituted by said back-scattered signal received slightly before said pulse, i.e. from said length (F2) upstream from said sensor, such that said measurement signal is not modified by any disturbance which may affect the measurement line at a distance from said sensor.

9. A device according to claim 8, characterized by the fact that the relative difference between the refractive indices of the two mediums (F2, 36) on either side of said return optical surface (38) lies between about 0.3 thousandths and 10 thousandths so that said coefficient of reflection lies between about 0.3 ten thousandths and about one thousandth and so that the peak intensity due to said reflection pulse (P2) is close to twice the peak intensity of the reference signal (VM2), said pulse being superposed on the back-scattered signal (VP2) occurring at the same time and thus giving rise to a resulting intensity which is three times the intensity of the reference signal, said intensities being measured in said reception circuit (16, 18, 20), (VM2), so as to provide the device with good sensitivity.

10. A device according to claim 1, characterized by the fact that said optical fiber (F) is a gradient index multimode fiber and said interrogation pulse generator comprises a semiconductor laser emitter (6) emitting at a wavelength of about 0.85 micrometers.

11. A device according to claim 1, characterized by the fact that said pulse generator (4,6) emits repetitive interrogation pulses having a pulse width of less than 100 nanoseconds and preferably of about 10 nanoseconds, and said light detector is constituted by a semiconductor avalanche photodiode (16).

* * * * *